(12) United States Patent
Gagnon

(10) Patent No.: US 6,266,586 B1
(45) Date of Patent: Jul. 24, 2001

(54) VEHICLE WHEEL VIBRATION MONITORING SYSTEM

(76) Inventor: Allain Gagnon, 311 Davies Rd, Saskatoon, Saskatchewan (CA), 27K 7N7

(*) Notice: Subject to any disclaimer, the term of this patent is extended or adjusted under 35 U.S.C. 154(b) by 0 days.

(21) Appl. No.: 09/456,573

(22) Filed: Dec. 8, 1999

(51) Int. Cl.[7] .................................................. G01M 19/00
(52) U.S. Cl. ............................................. 701/29; 701/31
(58) Field of Search ........................ 701/29, 37; 73/118.1

(56) References Cited

U.S. PATENT DOCUMENTS

| | | | |
|---|---|---|---|
| 3,677,077 | * 7/1972 | Merryman et al. | 73/146 |
| 4,458,535 | * 7/1984 | Juergens | 73/651 |
| 5,832,398 | * 11/1998 | Sasaki et al. | 701/37 |
| 5,952,564 | * 9/1999 | Naito et al. | 73/118.1 |

FOREIGN PATENT DOCUMENTS

| 2226829 | 9/1998 | (CA) . |
|---|---|---|
| 2203095 | 10/1998 | (CA) . |
| 3817809 | * 12/1989 | (DE) . |
| 421065 | * 4/1991 | (EP) . |
| 357003502 | * 1/1982 | (JP) . |

\* cited by examiner

Primary Examiner—William A. Cuchlinski, Jr.
Assistant Examiner—Marthe Y. Marc-Coleman
(74) Attorney, Agent, or Firm—Adrian D. Battison

(57) ABSTRACT

A vibration monitor is mounted on axles of a truck for monitoring vibrations in the axles and wheels of the truck which may indicate some type of failure associated with the wheels. The monitor includes a pair of pneumatic sensors mounted on the axles which are connected to a control box for disabling the truck. The control box is arranged to vent the air brake circuit of the truck for applying the brakes of the truck if the control box receives a vibration signal from the sensors having a magnitude which exceeds an acceleration threshold and a duration which exceeds a time threshold.

17 Claims, 3 Drawing Sheets

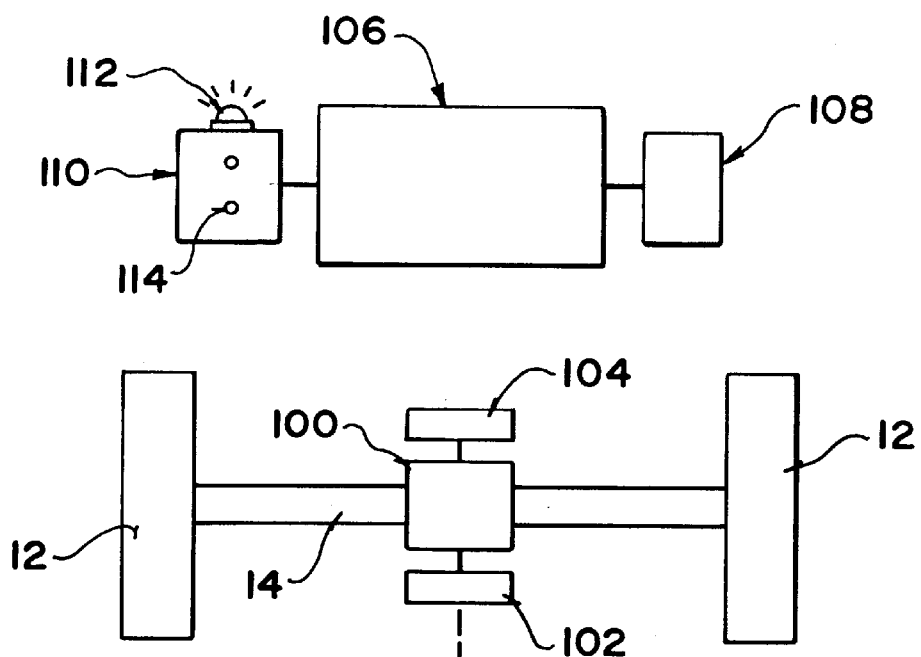
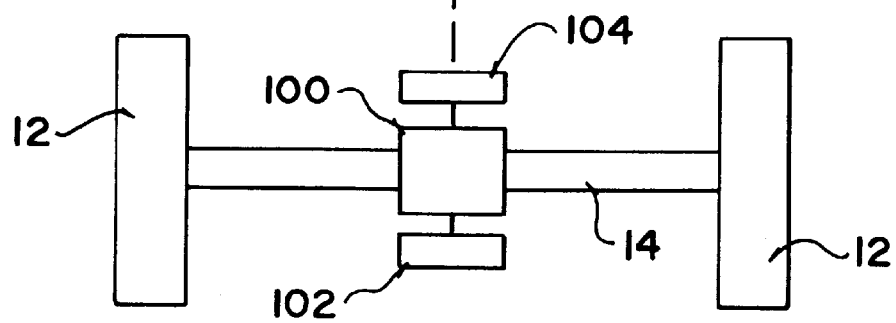
FIG. 3

VEHICLE WHEEL VIBRATION MONITORING SYSTEM

FIELD OF THE INVENTION

This invention relates to a vibration monitoring system for use in a motor vehicle and more particularly to a system for stopping the vehicle in response to a prescribed condition sensed by the system.

BACKGROUND

The use of large trucks for towing cargo trailers is common for transporting goods along various roadways. The trucks tend to travel long distances and are thus subject to various types of failure due to their repeated use. It has been known for trailer tires to come loose from their hubs and for tires be shredded once a small rupture has occurred. A released wheel or tire carcass on the road is a major road hazard.

Canadian Patents Applications 2,199,649 and 2,226,829 describe a monitoring device for detecting failures associated with the wheels of trucks and trailers. The device comprises individual axle spindle sensors and an alarm for alerting a driver of the truck when the sensors detect a vibration on the wheels or axles which indicates a possible failure. While the device senses vibrations which may indicate a potential failure, a driver may ignore, fail to notice or even disable the alarm indicator.

SUMMARY

According to the present invention there is provided a vibration monitor for use in monitoring vibrations on a wheel of a vehicle, the monitor comprising:

sensor means associated with the wheel for producing a vibration signal in response to a vibration comprising repeated accelerations acting on the wheel over an elapsed period of time; and disabling means for disabling the vehicle in response to receipt of a vibration signal from the sensor means which exceeds a prescribed vibration condition.

The use of the vibration monitor mounted on a truck for monitoring vibrations in the wheels of the truck reduces the risk of a dangerous accident resulting from a failure to one of the wheels or the axles of the truck. The disabling means ensures that the driver will be alerted and aware of possible failures by eliminating the risk of a driver ignoring or not noticing an indicator connected to the sensor means in place of the disabling means. The active feedback of the disabling means for halting the truck movement provides a greater guarantee of safety to other people on the road as opposed to relying upon the responsibility of the drivers of trucks on the road when the vibration monitor is not used.

The prescribed vibration condition preferably comprises an acceleration threshold and a time threshold such that a magnitude of the vibration must exceed the acceleration threshold and a duration of the vibration must exceed the time threshold in order for the disabling means to disable the vehicle.

The acceleration threshold is preferably adjustable over a range of magnitudes while the time threshold is preferably adjustable over a range of time limits.

The sensor means may comprise a pneumatic sensor such that the vibration signal is transmitted through a sensor line in the form of a variation in air pressure.

The disabling means preferably comprises a control element coupled to air brakes of the vehicle such that air pressure of the brakes is vented for applying the brakes when the control element receives the vibration signal.

The disabling means may alternatively comprise a control element coupled a throttle of the vehicle such that the vehicle is disabled when the control element receives the vibration signal.

An indicator may be coupled to the sensor line for indicating when the disabling means have been activated.

Preferably there is provided a reset element coupled to the disabling means such that when the vehicle is disabled, the vehicle remains disabled until the reset element is activated.

The reset element may comprise a manual switch coupled to the disabling means or a remote switch coupled to the disabling means such that an operator of the vehicle can reset the disabling means remotely.

The sensor means are preferably mounted on respective axles of the vehicle for sensing vibrations in the wheels and the axles of the vehicle.

One particular advantageous embodiment includes a wireless transmitter for each sensor and a receiver at the control for the disabling means. Instead of pneumatics, the sensor means may comprise an electrical sensor such that the vibration signal comprises an electrical signal which is representative of a vibration acting on the wheel.

BRIEF DESCRIPTION OF THE DRAWINGS

In the accompanying drawings, which illustrate an exemplary embodiment of the present invention:

FIG. 3 is a top plan view of a pair of truck axles with a schematic of a second embodiment of the vibration monitor connected thereto.

DETAILED DESCRIPTION

Figure 1:
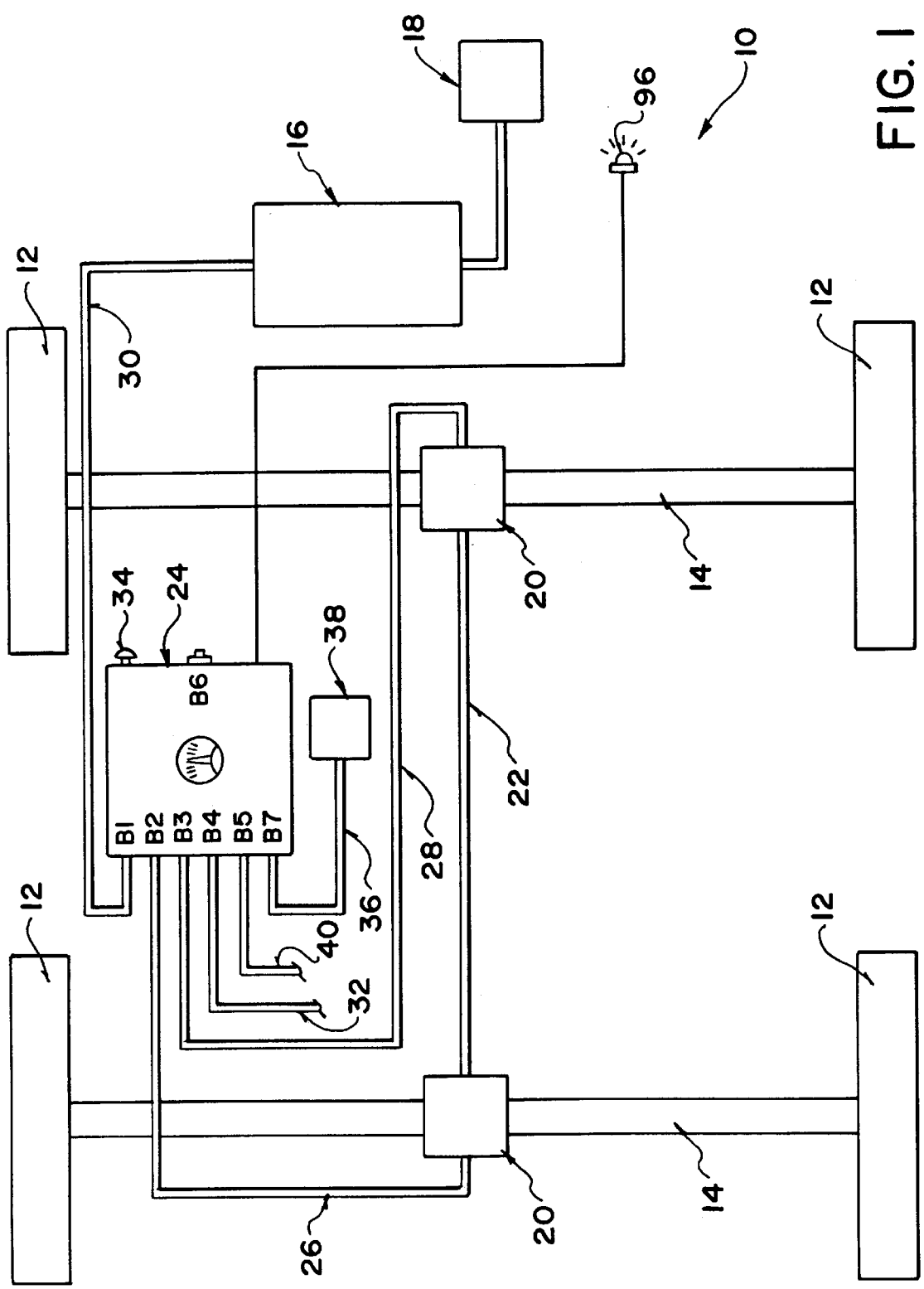
FIG. 1 is a top plan view of a pair of truck axles with a schematic of the vibration monitor connected thereto.

Referring to the accompanying drawings, there is illustrated a vibration monitor generally indicated by reference numeral 10. The vibration monitor 10 is intended for use in monitoring vibrations in the wheels 12 and axles 14 of a conventional truck or trailer. Monitoring vibrations in the wheels and axles provides a warning to a truck driver that such failures as loose tires, shredded tires or cracked and broken shafts and bearings may be present before the failure causes further damage. The monitor 10 is particularly suited for a truck which uses air brakes controlled by a main supply tank 16 of pressurised air. The pressure of air in the tank is controlled by a compressor 18 in a conventional arrangement.

The monitor 10 includes a vibration sensor 20 which mounts on each axle 14 of the truck spaced between the corresponding wheels 12 as well as on the axles of any associated trailer connected to the truck. The sensor 20 is a commercial available sensor known as a Model 4109 Vibroguard valve manufactured by Instrument and Control Service Company Inc. of Lake Villa, Ill. The sensor 20 is a two way acceleration sensing valve. Under normal conditions the valve of sensor 20 is closed, however when vibrations or shocks exceed a prescribed magnitude, the valve trips open and vents. The prescribed magnitude is adjusted as desired once the sensor 20 has been installed. A microswitch is included in the sensor 20 for producing an electrical signal when the valve is tripped for use with an electrical system as desired.

The sensors 20 are connected in series along a sensor line 22. The sensor line 22 connects the sensors 20 to a control box 24, the internal components of which will be described in further detail below. The sensor line 22 is connected at a venting end 26 to terminal B2 of the control box 24 and connected at a reset end 28 to terminal B3 of the control box.

A main pressure supply line 30 is connected to terminal B1 of the control box and supplies pressurised air to the control box. The supply line 30 is connected directly to the main supply tank 16. The air in the supply tank is passed through an air dryer for use in colder climates to remove any moisture which could affect the functioning of the valves.

A remote reset line 32 is connected to terminal B4 of the control box at a first end. A second end of the reset line 32 is connected to a remote supply of pressurised air such that activation of a remote reset switch will send a reset signal in the form of a flow of pressurised air through the reset line 32 and into the control box via terminal B4. The reset signal is also generated by activating a manual reset switch 34 on the control box 24 which allows the flow of pressurised air for resetting the control box to be diverted from the main supply line 30 instead of through the reset line 32 as described in further detail below.

A control line 36 connects terminal B7 of the control box to a junction box 38. The junction box 38 forms a part of the air brake circuit of the truck such that venting the control line 36 will vent the air pressure in the brake circuit such that the brakes of the vehicle are applied. A vent line 40 is connected to the terminal B5 of the control box for venting the control line 36 when a vibration condition is sensed by the control box. The vibration condition comprises a vibration of repeated accelerations which has acted on one of the wheels or axles of the truck. The vibration must be of sufficient magnitude as determined by the sensor 20 and of sufficient duration as determined by the control box 24 to exceed prescribed a magnitude and duration in order for the control box to determine a vibration condition for venting the control line 36.

Figure 2:
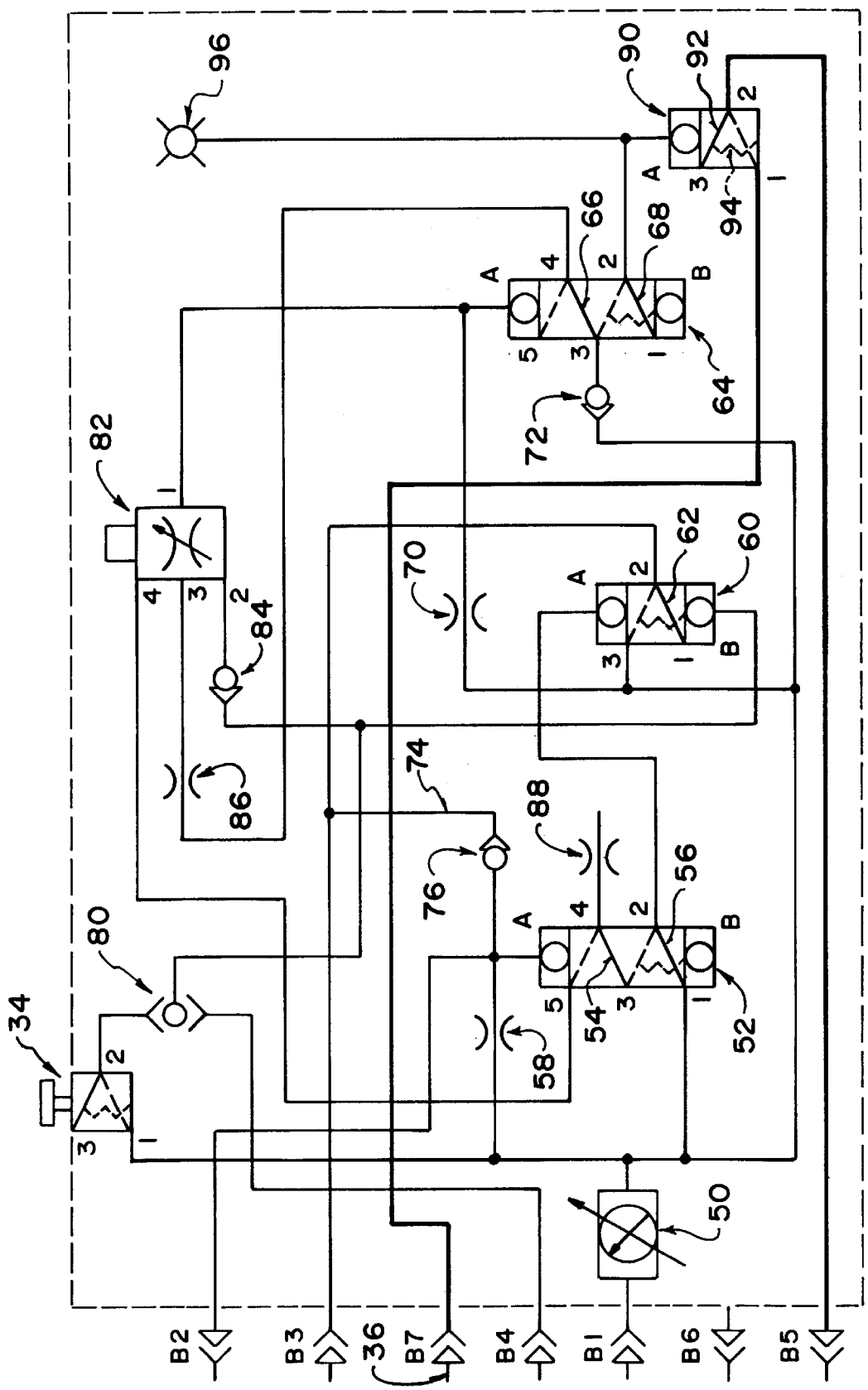
FIG. 2 is a schematic showing internal components of the control box of FIG. 1.

The inner components of the control box 24 are shown in greater detail in FIG. 2 of the drawings. The terminal B1 receives the main supply line 30 for supplying pressurised air to the system within the control box 24. A pressure regulator 50 is located adjacent the terminal B1 for regulating the air pressure.

The manual reset switch 34 is connected to the output of the regulator 50 such that depressing the switch will open the line for allowing the pressurised air to pass. This supply of pressurised air from the manual reset switch acts to reset the system to an equilibrium in a non vibration condition.

A first control switch 52 includes an upper latch 54 connected at an output to port 4 of the switch, the latch being movable at an input between ports 3 and 5 of the switch wherein port 3 is sealed shut. The first control switch 52 also includes a lower latch 56 connected at an output to port 2 of the switch and is movable at an input between ports 1 and 3 of the switch. The first control switch 52 includes a first pressure chamber at an upper end A and a second pressure chamber at a lower end B such that changes in the relative pressure between ends A and B will effectively displace the upper and lower latches 54, 56 between the respective inputs in a direction away from the greater pressure at either end A or end B of the switch.

The first control switch 52 is connected at end A to the output of the regulator 50 through a flow restrictor 58 and is also connected to the output of the regulator 50 at port 1.

A second control switch 60 includes a single latch 62 connected at an output to port 2 of the switch, the latch being movable at an input between ports 1 and 3 of the switch. The single latch 62 is controlled similarly to the first control switch by respective pressure chambers at ends A and B of the second control switch 60. The end A of the second control switch 60 is connected to port 2 of the first control switch 60 for receiving pressurised air therethrough from the regulator when the lower latch 56 is connected to port 1. Port 3 of the second control switch is connected to the output of the regulator for receiving pressurised air therefrom.

A third control switch 64 includes an upper latch 66 connected at an output to port 4 of the switch, the latch being movable at an input between ports 3 and 5 of the switch. The third control switch 64 also includes a lower latch 68 connected at an output to port 2 of the switch, the latch being movable at an input between ports 1 and 3 of the switch. The latches 66, 68 are controlled similarly to the first control switch by respective pressure chambers at ends A and B of the third control switch 64. The third control switch 64 is connected to the output of the regulator 50 at end A through a flow restrictor 70 and at port 3 through a check valve 72.

Terminal B2 of the control box acts as a vent when one of the sensors 20 is tripped. The terminal B2 is connected to end A of the first control switch 52. A secondary vent line 74 connects terminal B3 of the control box as well as port 2 of the second control switch 60 to end A of the first control switch 52. A check valve 76 is mounted within the secondary vent line 74 such that the flow of pressurised air is only permitted to flow through the line towards the terminal B2. Terminal B3 of the control box is also connected to the sensors 20 and receives pressurised air from terminal B2 when the sensor is in a non vibration condition such that the flow of pressurised air flows into the control box through terminal B3 in the form of a reset signal. The control box will reach an equilibrium non vibration condition if the reset signal is continuously transmitted from the sensors through terminal B3 and the control box has not undergone a vibration condition without being reset.

The manual reset switch 34 includes a reset latch 78 which is connected at an output to port 2 of the switch, the latch being movable at an input being ports 1 and 3 of the switch. Port 1 of the reset switch 34 is connected to the output of the regulator while port 3 is sealed shut. Port 2 of the reset switch 34 is connected to an input of a double check valve 80 which acts as an OR switch. The other input of the double check valve 80 connects to terminal B4 of the control box. In this arrangement a flow of pressurised air coming from either the terminal B4 or from the regulator 50 when the manual reset switch 34 is depressed result in the flow of pressurised air continuing through the output of the double check valve 80 in the form of a reset signal.

The output of the double check valve 80 connects to port 2 of a variable throttling valve 82 through a check valve 84 and to end B of the second control switch 60. The throttling valve 82 is connected at port 1 of the valve to end A of the third control switch 64. The throttling valve 82 is also connected at port 3 of the valve to port 4 of the third control switch 64 through a flow restrictor 86. Port 4 of the throttling valve 82 vents to port 5 of the first control switch 52 which then vents through flow restrictor 88 into the control box when the upper latch 54 is connected to port 5 of the first control switch. The flow restrictor 88 vents into the control box which is vented at terminal 86.

Port 2 of the third control switch 64 is connected to end A of a main control switch 90. The main control switch 90 includes a single latch 92 which is connected at an output to port 2 of the switch, the latch being movable at an input between ports 1 and 3 of the switch. Port 1 of the switch 90 connects to terminal B7 while port 2 of the switch connects to terminal B5 such that the switch interrupts the venting of the brake circuit of the truck. The latch 92 is urged towards port 3 by a spring 94 for preventing venting of the control line 36. End A of the main control switch includes a pressure chamber for urging the latch 92 towards port 1 when a flow of pressurised air is received from port 2 of the third control switch for venting the control line 36 when a vibration condition is sensed.

End A of the main control switch 90 is also connected to an indicator 96. The indicator 96 is arranged to be activated when the latch 92 of the main control switch 90 is displaced towards port 1 such that activation of the indicator indicates when the control line 36 is being vented. The indicator 96 is mounted in a visible location such that it is clear to the operator of the truck that a vibration condition has occurred.

When the monitor 10 is mounted on a truck in use, the control switches are normally oriented as shown in FIG. 2 in the non vibration condition for normal operation of the brakes of the vehicle. If the sensors 20 mounted on the wheel axles senses a vibration of repeated accelerations which exceeds a predetermined acceleration threshold of the sensors in one of the wheels or axles, the sensor line 22 will begin to vent and continue to vent as long as the sensors 20 are being subjected to the vibration which exceeds the acceleration threshold of the sensors.

When the sensor line 22 vents, terminal B2 on the control box vents end A of the first control switch 52 such that the upper and lower latches 54, 56 are deflected towards end A. The throttling valve 82 is thus vented through the flow restrictor 88 once the upper latch 54 connects to port 5 on the first control switch 52.

Once the throttling valve 82 begins venting through flow restrictor 88, end A of the third control switch 64 is slowly vented, while the regulator partially maintains the pressure at end A of the third control switch 64 through the flow restrictor 70. The amount of time required to vent end A of the third control switch 64 is determined by the difference between the venting action of the throttling valve 82 and the flow of pressurised air passing through the flow restrictor 70. This amount of time required to vent end A of the third control switch 64 is the time limit threshold of the control box. The time limit threshold is the amount of time required for one of the sensors to be exceeding its respective acceleration threshold before a vibration condition is determined and the control line is vented.

The time limit threshold is adjustable within a range of time constants by adjusting the throttling valve 82 such that the flow of air being vented therethrough is adjusted.

If the sensors 20 are vented for a period of time which is less than the time limit threshold, the pressure at end A of the first control switch 52 will be restored for cutting off the venting action through flow restrictor 88 before the third control switch is deflected upward such that the control line is not vented.

If the sensors 20 are vented for a period of time which exceeds the time limit threshold, the pressure at end A of the first control switch 52 will be lost for venting the throttling valve 82 through flow restrictor 88. Venting the throttling valve 82 will result in a pressure loss at end A of the third control switch 64 such that the upper and lower latches 66, 68 are deflected upward for supplying pressurised air to end A of the main control switch 90. The control line 36 will thus be vented as the latch 92 of the main control switch is deflected downward while the control box remains in equilibrium in a vibration condition. Venting the control line 36 will result in a loss of air pressure in the brake circuit for disabling the truck by partially or fully applying the brakes of the truck.

The latch 92 of the main control switch 90 remains deflected downward for venting the control line 36 until the control box is reset. The control box is reset by producing the reset signal via the remote reset line 32 or by using the manual reset switch 34. In either case, the reset signal will provide pressurised air to end B of the second control switch 60 for deflecting the latch 62 upward such that the input of the latch connects to port 3 of the switch. Once the latch 62 is deflected upward, the output of the regulator 50 is connected therethrough to the sensor reset line 28 and to end A of the first control switch 52 through check valve 76. The flow of air from the regulator will thus deflect the latches of the first control switch 52 downward such that the throttling valve 82 is no longer vented. Accordingly the pressure at end A of the third control switch 64 returns to normal for cutting off the pressure at end A of the main control switch, thus the control line 36 is no longer vented.

In further arrangements, the junction box 38 may couple the control line 36 to a system within the truck other than the brake circuit, such as the throttle, for disabling the vehicle in response to the vibration condition as in the embodiment described above. Additionally, the indicator 96 may be connected to relays mounted on the respective sensors 20 for indicating which sensor has been tripped in the event of a vibration condition for assisting the operator in locating the failure on the truck.

Numerous sensors 20 can be mounted in series along the sensor line 22 such that the sensors can be located on the axles of a trailer connected to the truck as well as the truck itself as described above. When the sensors are mounted on the trailer, the control box can also be connected to the brake circuit of the trailer for braking both the trailer and the truck when a vibration is detected. The limiting factor in determining how many sensors can be connected in series is the length of the sensor line. Extending the length of the sensor line beyond the limits of the system will result in an insufficient line pressure for effectively transmitting the vibration signal.

In an alternative embodiment, as shown in FIG. 3, electronic sensors 100 are mounted on the truck axles and include respective batteries 102 for powering the sensors independently from the truck on which the sensors are mounted.

Each sensor 100 is a remote unit having its own wireless transmitter 104. The electronic sensors produce a vibration signal in response to repeated vibrations similarly to the sensors 20 of the first embodiment and remotely relay the vibration signal to an electronic control box 106. The control box 106 includes a receiver 108 for receiving the remote vibration signals.

The electronic control box serves a similar purpose as the control box 24 of the first embodiment for determining a vibration condition in response to a vibration signal from the electronic sensors which exceeds an acceleration threshold for a period of time which is longer than a time limit threshold of the control box. Once a vibration condition has been determined, the control box acts in a similar manner as in the first embodiment to either control the brakes or the throttle of the truck in such a manner so as to slow or stop the vehicle's movement.

The values of both the acceleration threshold and the time limit threshold are adjustable such that the monitor responds properly to vibrations resulting from a failure while the monitor does not produce a vibration condition when no failure is present.

A failsafe on the control box will trip if one of the sensor batteries fails to ensure that the monitor is always functioning properly when the truck is in use.

An operator interface 110 is coupled to the control box and includes an operator indicator 112 as well as reset control buttons 114 which function in response to similar conditions as in the first embodiment.

While some embodiments of the present invention have been described in the foregoing, it is to be understood that other embodiments are possible within the scope of the invention. The invention is to be considered limited solely by the scope of the appended claims.

What is claimed is:

1. A vibration monitor for use in monitoring vibrations on a wheel of a vehicle, the monitor comprising:
    an acceleration sensor associated with the wheel and being arranged to produce a vibration signal in response to and representing repeated accelerations acting on the wheel over an elapsed period of time;
    a controller arranged to receive the vibration signal from the acceleration sensor, the controller including a time threshold and an acceleration magnitude threshold which define a prescribed vibration condition, the controller being arranged to determine that the vibration signal exceeds the prescribed vibration condition when a magnitude of the vibration signal exceeds the acceleration magnitude threshold and a duration of the vibration signal exceeds the time threshold; and
    a disabling mechanism arranged to disable the vehicle in response to determination by the controller that the vibration signal exceeds the prescribed vibration condition.

2. The monitor according to claim 1 wherein the acceleration magnitude threshold is adjustable over a range of magnitudes.

3. The monitor according to claim 1 wherein the time threshold is adjustable over a range of time limits.

4. The monitor according to claim 1 wherein the acceleration sensor comprises a pneumatic sensor such that the vibration signal comprises a variation in air pressure transmitted through a sensor line between the sensor and the controller.

5. The monitor according to claim 4 wherein the disabling mechanism comprises a control element coupled to air brakes of the vehicle such that air pressure of the brakes is vented for applying the brakes when the control element receives the vibration signal.

6. The monitor according to claim 4 wherein the disabling mechanism comprises a control element coupled to a throttle of the vehicle such that the vehicle is disabled when the control element receives the vibration signal.

7. The monitor according to claim 4 wherein there is provided an indicator coupled to the sensor line for indicating when the disabling mechanism has been activated.

8. The monitor according to claim 1 wherein there is provided a reset element coupled to the disabling mechanism such that when the vehicle is disabled, the vehicle remains disabled until the reset element is activated.

9. The monitor according to claim 8 wherein the reset element comprises a manual switch coupled to the disabling mechanism.

10. The monitor according to claim 8 wherein the reset element comprises a remote switch coupled to the disabling mechanism such that an operator of the vehicle can reset the disabling mechanism remotely.

11. The monitor according to claim 1 wherein there is provided an indicator coupled to the disabling mechanism for indicating to an operator of the vehicle that the disabling mechanism has been activated.

12. The monitor according to claim 1 wherein the acceleration sensor is mounted on respective axles of the vehicle for sensing vibrations in the wheels and the axles of the vehicle.

13. The monitor according to claim 1 wherein the acceleration sensor comprises an electrical sensor such that the vibration signal comprises an electrical signal which is representative of a vibration acting on the wheel.

14. The monitor according to claim 1 wherein the disabling mechanism comprises a control element coupled to brakes of the vehicle such that the brakes are applied when the control element receives the vibration signal.

15. The monitor according to claim 1 wherein the disabling mechanism comprises a control element coupled a throttle of the vehicle such that the vehicle is disabled when the control element receives the vibration signal.

16. A vibration monitor for use in monitoring vibrations on a wheel of a vehicle, the monitor comprising:
    an electrical acceleration sensor associated with the wheel and being arranged to sense repeated accelerations acting on the wheel in at least two different directions and produce a vibration signal in response to the repeated accelerations acting on the wheel over an elapsed period of time, the vibration signal comprising an electrical signal representing the repeated accelerations acting on the wheel over the elapsed period of time;
    a controller arranged to receive the vibration signal from the acceleration sensor, the controller including a time threshold and an acceleration magnitude threshold which define a prescribed vibration condition, the controller being arranged to determine that the vibration signal exceeds the prescribed vibration condition when a magnitude of the vibration signal exceeds the acceleration magnitude threshold and a duration of the vibration signal exceeds the time threshold; and
    a disabling mechanism arranged to engage brakes of the vehicle in response to determination by the controller that the vibration signal exceeds the prescribed vibration condition so as to disable the vehicle.

17. A vibration monitor for use in monitoring vibrations on a wheel of a vehicle, the monitor comprising:
    an electrical acceleration sensor associated with the wheel and being arranged to produce a vibration signal in response to repeated accelerations acting on the wheel over an elapsed period of time, the vibration signal comprising an electrical signal representing the repeated accelerations acting on the wheel over the elapsed period of time;
    a controller arranged to receive the vibration signal from the acceleration sensor, the controller including a time threshold and an acceleration magnitude threshold which define a prescribed vibration condition, the controller being arranged to determine that the vibration signal exceeds the prescribed vibration condition when a magnitude of the vibration signal exceeds the acceleration magnitude threshold and a duration of the vibration signal exceeds the time threshold;
    a disabling mechanism arranged to disable the vehicle in response to determination by the controller that the vibration signal exceeds the prescribed vibration condition;
    an electrical power supply arranged to supply electrical power to the electrical acceleration sensor; and
    a failsafe mechanism arranged to monitor power supplied to the electrical acceleration sensor from the electrical power supply and to disable the vehicle in response to a loss of electrical power supplied to the electrical acceleration sensor.

* * * * *